(12) United States Patent
Hathaway et al.

(10) Patent No.: US 11,456,998 B2
(45) Date of Patent: *Sep. 27, 2022

(54) SYSTEM AND METHOD FOR ENCRYPTION, STORAGE AND TRANSMISSION OF DIGITAL INFORMATION

(71) Applicant: Virtual Connect Technologies, Inc., Greenville, SC (US)

(72) Inventors: Benjamin Hathaway, Simpsonville, SC (US); David Setzer, Greenville, SC (US)

(73) Assignee: Virtual Connect Technologies, Inc., Greenville, SC (US)

( * ) Notice: Subject to any disclaimer, the term of this patent is extended or adjusted under 35 U.S.C. 154(b) by 295 days.

This patent is subject to a terminal disclaimer.

(21) Appl. No.: 16/886,921

(22) Filed: May 29, 2020

(65) Prior Publication Data

US 2020/0382474 A1 Dec. 3, 2020

Related U.S. Application Data

(63) Continuation of application No. 16/001,740, filed on Jun. 6, 2018, now Pat. No. 10,708,244.

(60) Provisional application No. 62/516,611, filed on Jun. 7, 2017.

(51) Int. Cl.
| | |
|---|---|
| *H04L 9/40* | (2022.01) |
| *H04L 9/08* | (2006.01) |
| *H04L 51/18* | (2022.01) |
| *H04L 51/08* | (2022.01) |

(Continued)

(52) U.S. Cl.
CPC .......... *H04L 63/045* (2013.01); *H04L 9/0825* (2013.01); *H04L 51/08* (2013.01);

(Continued)

(58) Field of Classification Search
CPC . H04L 63/045; H04L 63/0442; H04L 63/168; H04L 63/0428; H04L 63/0471; H04L 9/0825

(Continued)

(56) References Cited

U.S. PATENT DOCUMENTS

| | | | |
|---|---|---|---|
| 7,174,368 B2* | 2/2007 | Ross, Jr. ............. | H04L 63/0442 709/229 |
| 7,302,487 B2* | 11/2007 | Ylonen ............... | H04L 63/0853 713/185 |

(Continued)

*Primary Examiner* — Badri Narayanan Champakesan
(74) *Attorney, Agent, or Firm* — Kim and Lahey Law Firm, LLC; Douglas W. Kim

(57) ABSTRACT

This invention is directed to a computerized system for encryption and transmission of digital information comprising: an encryption server in communications with a sender computer device and a recipient computer device; and, a set of encryption server computer readable instructions included on the encryption server that, when executed by a processor, preform the steps of: receiving an original information set from the sender computer device, generating a sender key, encrypting a portion of the original information set with the sender key, generating an key pair having a public and private key pair, encrypting the sender key with the public key of the key pair, encrypting the private key of the key pair with a master key, generating a hyperlink to the encrypted portion of the original information set, transmitting the hyperlink to the recipient computer device.

19 Claims, 4 Drawing Sheets

(51) Int. Cl.
*H04L 67/00* (2022.01)
*H04L 67/01* (2022.01)
*H04L 67/52* (2022.01)

(52) U.S. Cl.
CPC .......... *H04L 51/18* (2013.01); *H04L 63/0428* (2013.01); *H04L 63/0442* (2013.01); *H04L 63/0471* (2013.01); *H04L 63/168* (2013.01); *H04L 67/34* (2013.01); *H04L 67/01* (2022.05); *H04L 67/52* (2022.05); *H04L 2463/061* (2013.01)

(58) Field of Classification Search
USPC ........................................................ 713/153
See application file for complete search history.

(56) References Cited

U.S. PATENT DOCUMENTS

| | | | | |
|---|---|---|---|---|
| 8,099,598 B1* | 1/2012 | Liu | .......................... | H04L 9/083 380/255 |
| 8,341,249 B2* | 12/2012 | Rakowski | ............. | H04L 63/083 713/400 |
| 8,707,442 B1* | 4/2014 | Lax | .................... | H04N 21/2541 726/26 |
| 10,291,589 B1* | 5/2019 | Sharifi Mehr | ........ | H04L 63/205 |
| 2002/0016913 A1* | 2/2002 | Wheeler | ............... | H04L 9/3247 713/181 |
| 2004/0005051 A1* | 1/2004 | Wheeler | ............... | H04L 9/3231 380/28 |
| 2006/0021066 A1* | 1/2006 | Clayton | ................ | H04L 9/0822 726/28 |
| 2013/0276017 A1* | 10/2013 | Walker | ............... | H04N 21/4524 725/31 |
| 2014/0068273 A1* | 3/2014 | Sobel | .................... | G06F 16/196 713/189 |
| 2015/0012339 A1* | 1/2015 | Onischuk | ............... | G07C 13/00 235/386 |
| 2015/0220718 A1* | 8/2015 | Hong | ...................... | H04L 63/18 726/9 |
| 2017/0220612 A1* | 8/2017 | Crossley | ............ | G06F 16/24554 |
| 2017/0338967 A1* | 11/2017 | Lewison | ...................... | H04L 9/3268 |
| 2018/0167221 A1* | 6/2018 | Kalan | ....................... | H04L 9/30 |

* cited by examiner

SYSTEM AND METHOD FOR ENCRYPTION, STORAGE AND TRANSMISSION OF DIGITAL INFORMATION

REFERENCE TO RELATED APPLICATIONS

This application is a continuation of U.S. application Ser. No. 16/001,740 filed on Jun. 6, 2018.

BACKGROUND OF THE INVENTION

1) Field of the Invention

The invention is directed to an improved secure encryption system using composite encryption scheme without necessarily modification to an existing email client.

2) Description of Related Art

There is an increased need for encrypted communications given the rise in data breaches. For example, it has been reported that had encrypted email been used, the breaches of SONY, State Department networks, Stratfor and Penn State Hospital may have been prevented. However, the majority of digital information is transmitted unencrypted. While there are many reasons that email encryption is not as widely deployed, some of the more common include complexity, compatibility, degraded computer performance, recipient requirements and the like. As for compatibility issues, if the encryption system uses S/MIME it may not be compatible with PGP. Further, other systems do not allow you to use your current email client but require a proprietary email client to send and receive messages. This and other disadvantages and complexities have prevented encrypted email from being widely deployed.

Further, most encryption solutions rely on downloading and installing one or more applications (apps) and/or plugins. This complexity is a substantive barrier to most users and generates more support tickets than should be needed Further, digital information can be kept for extended periods of time, even when the purpose of the message has long since passed. Keeping messages for long periods of time increases the risk that security will be breached. The complexity of creating an account, downloading and installing an app or plug-in, logging into the downloaded software and learning how to use the software have depressed wide spread deployment of encrypted email systems.

Further, passwords and keys must be managed which can lead to unrecoverable digital information if the keys and passwords are lost as well as increased administration efforts. For example, U.S. Pat. No. 7,174,368 is directed to a system, method, and computer program product for providing an encrypted email reader and responder. This disclosure stated that it can include: obtaining by a first user a license for an email client software application program having public/private encryption; requesting by the first user that a second user download a reader/responder software application program in order to exchange encrypted email between the first user and the second user; downloading and installing the reader/responder software application program by the second user; sending an email by the second user to the first user including embedding an unencrypted public key by using a send key function of the reader/responder software application program; receiving the email from the second user by the first user, wherein the unencrypted public key is embedded in the email; responding by the first user by sending a second email to the first user, where the reader/responder software application program encrypts a message of the second email into an encrypted message using the unencrypted public key of the second user; receiving the second email by the second user with the encrypted message as an attachment from the first user into a third party email software application program, wherein the third party email software application program is different from the reader/responder software application program and the email client software application program; and opening by the second user the attachment to execute the reader/responder software application program operative to allow a user without the email client software to read and respond to encrypted email created and sent from a user having the email client software. Such a process presents multiple points of user's error and unnecessary complex administrative requirements.

Attempts have been made for reducing complexity to the user such as biometric system as disclosed in United States Patent Application Publication 20030140235. This disclosure is a method for permitting the secure transmission of electronic messages by using biometric certification. Enrolled fingerprint feature sets, which have been uniquely modified for a particular person with whom messages will be exchanged, are cross-enrolled between the sender and receiver such that the biometric identity of both the sender and receiver can be checked during message sending and receiving. In one embodiment, the sender provides a live-scan fingerprint feature set which is subtracted from the enrolled fingerprint feature set of the sender to create a "difference key" that is used to encrypt the message and other fingerprint data. The receiver decrypts the sender's live-scan fingerprint feature set that is then used to reconstruct the difference key, which is then used to decrypt the message. Obviously, this requires a fingerprint scanner.

United States Patent Application Publication 2006/0021066 also relies upon a downloaded software application. This disclosure is directed to an encryption system that includes memory for storing a data file and a decryption application. The decryption application is configured to authenticate a user and to receive a data packet.

The data packet has a data message encrypted via an encrypted encryption key that is embedded within the data packet. The decryption application is configured to decrypt the data message based on the embedded encryption key and to interface the decrypted data message with the user if the user is authenticated by the decryption application. The decryption application is configured to recover the encryption key and to decrypt the data message based on data within the data packet and based on data within the data file, and the decryption application controls access to the data within the data file based on whether the user is authenticated by the decryption application.

A system that is easy to use, does not require propriety hardware, can be used with any platform or email client and provides secure transmission as needed.

Accordingly, an objective of the present invention is to provide an encryption system allowing the user to continue to use the existing email client without needing to download any apps or plug-ins and without needing passwords.

SUMMARY OF THE INVENTION

The present invention directed to a computerized system for encryption and transmission of digital information comprising: an encryption server in communications with a sender computer device and a recipient computer device; and, a set of encryption server computer readable instructions included on the encryption server that, when executed by a processor, preform the steps of: receiving an original information set from the sender computer device, generating a sender symmetrical key, encrypting a portion of the original information set with the sender symmetrical key, receiving a personal data key from the sender computer device, generating an asymmetric key pair having a public and private key pair, encrypting the sender symmetrical key with the public key of the asymmetrical key pair and the personal data key, encrypting the private key of the asymmetrical key pair with a master key, generating a hyperlink to the encrypted portion of the original information set, transmitting the hyperlink to the recipient computer device wherein the hyperlink includes security properties taken from the group consisting of an expiration time for the hyperlink, an expiration time for the original information set, device dependent information, geolocation dependent information, biometric information, or any combination thereof, receiving a reply from the recipient computer device, generating a recipient symmetrical key, encrypting the reply with the recipient symmetric key, encrypting the recipient symmetrical key with the private key of the asymmetrical key pair, creating a reply hyperlink to include a link to the encrypted reply, and transmitting the reply hyperlink to the sender computer device.

The computerized system can include a gateway server in communications with the encryption server; and, a set of gateway computer readable instructions on the gateway server that, when executed by a processor, preform the steps of: receiving the original information set, and determining if the original information set includes trigger information and if so, encrypting a portion of the original information set with the sender symmetrical key. The server computer device can include software taken from the group consisting of a text message client, email client, digital scanner, digitizing copier, digital image capture device or any combination thereof. The recipient computer device can include an email client in communications with an email server for receiving the sender hyperlink and providing the sender hyperlink in an email message to a recipient. The recipient computer device can include a text message client in communications with a text message server for receiving the sender hyperlink and providing the sender hyperlink in a text message to a recipient.

The computerized system can include a sender thread initiated by the creation of the original information set; a recipient thread initialed by the creation of a reply to the original information set; and, the set of encryption server computer readable instructions includes instructions for encrypting the sender thread with the sender symmetrical key and encrypting the recipient thread with the recipient symmetrical key.

Each user, sender and receiver, can have a separate message thread that can be encrypted with the user's symmetrical key. Therefore, an individual message can be copied and encrypted for each user on the thread. For the n number of user, senders and receivers, there can be at least n user symmetric encryption keys and n threads.

The encryption computer readable instructions can include instructions for periodically generating a subsequent asymmetric key pair having a public and private key pair; encrypting the sender symmetrical key with the public key of the subsequently generated asymmetrical key pair and encrypting the private key of the subsequently generated asymmetrical key pair with the master key. The sender computer device can include an email client and the encryption computer readable instructions can include instructions for decrypting all information in the original information set received from the sender computer device, decrypting all the original information set using the private key of the asymmetrical key pair and the symmetrical key and transmitting the decrypted original information set to an email server in communication with the email client.

The encryption computer readable instructions can include instructions for providing an interface to a user for direct creation of the original information set. The original information set can include an email message and the encryption computer readable instructions can include instructions for determining if a subject line included in the email message includes a left and right bracket and if so, encrypting the portion of the original information set with the sender symmetrical key.

The encryption computer readable instructions can include instructions for encrypting a first portion of the original information set with a first sender symmetrical key and encrypting a second portion of the original information set with a second sender symmetrical key. The first portion can be a text of an email message and the second portion can be an attachment associated with the text of the email message. The second portion can be a second portion of text of the email message.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
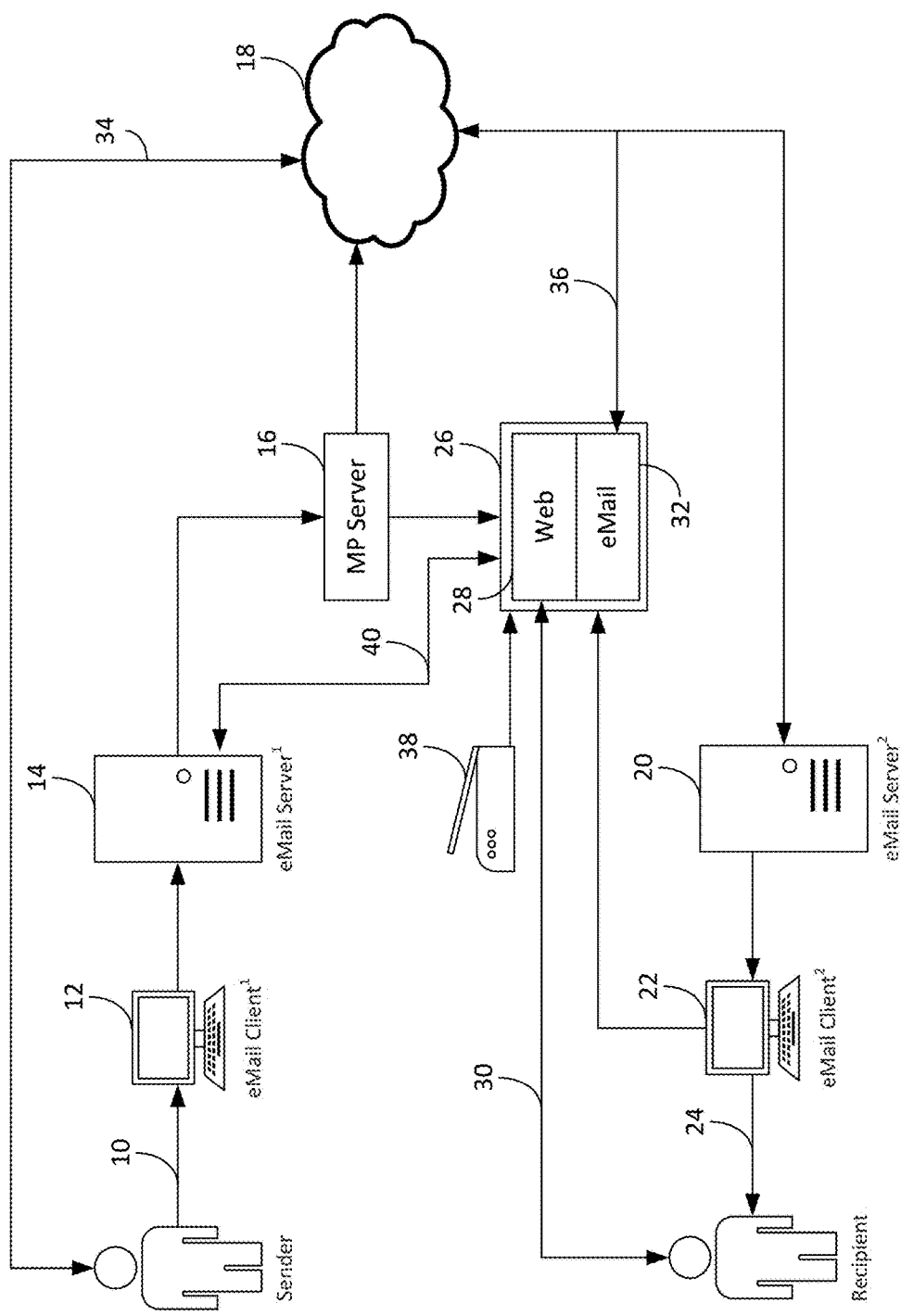
FIG. 1 is a diagram of aspects of the invention.

Computer readable instructions, when executed by a computer processor, cause the computer to perform a series of steps to accomplish a specific task and results in useful, concrete and tangible results. These computer readable instructions can be tied to a particular machine or apparatus with the specific purpose of executing the computer readable code for accomplishing tangible results and represents and accomplishes the manipulation of physical data.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result when executed by a computer and its processor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code may not be contained within one file or one storage medium but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions or code.

Elements of the flowchart support combinations of means for performing the special functions, combinations of steps for performing the specified functions and program instruction means for performing the specified functions. It will be understood that each block of the flowchart illustrations can be implemented by special purpose hardware-based computer systems that perform the specified functions, steps, or combinations of special purpose hardware or computer instructions.

The invention herein is necessarily rooted in computer technology in order to overcome a problem specifically arising in the realm of computer communications and digital transmissions. This invention is not merely the routine or conventional use of a computer of software, but an improvement over the existing technology operation of computer systems. The problem solved by this invention is problem unique to digital information and email encryption, storage, and transmission.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Referring to FIG. 1 an email is created at 10 using the existing email client 12. The email client can be any number of known email clients and does not have to be proprietary to this invention. In the subject line, the text of the subject line can include a designation indicating that the sender wishes that the email be encrypted. For example, the text of the subject line can be "bracketed" by placing indicators, such as brackets in with the subject line. This indicator can be any indicator that can be deciphered by a server and indicate that the email is to be encrypted. In one embodiment, the indicators are square brackets placed to the left and right of the subject line (e.g. [Subject Line]).

Once sent, the email is transmitted to the sender's email server 14. The email server recognizes the user email account as a licensed user and can redirect the message to a gateway server 16. If the sender does not request that the email be encrypted, the email can be sent through a wide area network 18 to the recipient's email server 20. The email is provided to the recipient's email client 22 and accessed by the recipient at 24.

The communications between the email client 12 and the email server 14 can be secured socket layer (SSL) or transport layer security (TLS). The communications between the email server 14 and the gateway server 16 for unencrypted email can be through TLS. Communications between the gateway server 16 through the wide area network to the recipient's email server 20 can be simple mail transport protocol (SMTP). The communication between the recipient's email server and the recipient's email client can be SSL or TLS.

In the event that the sender wishes for the email transmitted at 10 to be encrypted, the sender can indicate that the message is to be encrypted. In this case, the gateway server 16 determines that the message is to be encrypted and passes the message to an encryption server 26. The message can be sent with TLS. The encryption server then creates a notification link that can be transmitted through email computer readable instructions that include a hyperlink to a location on the encryption server, include a link in a text message or other electronic messaging that can be provided to a recipient. This notification link can be transmitted as an email message to the email server 20 to the recipient. The email client of the recipient is used to retrieve the email having the notification link. The notification link points to the web portion 28 of the encryption server where the recipient's browser can communications between the recipient and the encryption server at 30. The browser can communicate using hyper text transfer protocol secure (HTTPS) and can use SSL or TLS. The encryption server can authenticate the email with physical location/geolocation, unique identifier or the like so that passwords are not needed for subsequent access. The recipient accesses the link and views the encrypted message through secure connection 30. The recipient can view the message and can then reply to the message. The original sender can be notified that the recipient replied and then view the reply in the secure link on the web portion of the encryption server. The recipient does not need to be a licensed user to view the initial message, reply, or participate in the encrypted communication. A licensed user can also initiate an encrypted message by accessing the web portion 32 of the encryption server directly at 34 and 36 through the sender's browser using secure connection to the encryption server.

The gateway server and the encryption server can be logical servers, located on the same physical server, distributed over multiple servers or on physically distinct servers.

When the sender creates the message at 10, the sender can designate security properties to the message. These security properties can be transmitted to the encryption server so that the link sent to the recipient can include these security properties. The security properties can include an expiration time for the link so that the link is only active for a predetermined period of time. Further, the underlying data can be set to automatic deletion after a predetermined period of time. The security properties can include a device dependent property so that the identification of the initial device used to initially open the link will associated with the link so that the link can then only be subsequent access from that device. The security properties can include a geolocation information associated with the recipient or the link. In one embodiment, the sender can determine the physical location allowable for accessing the link. For example, the link may only be accessible from the device within a certain geographic location, such as a country, state or other physical location. In one embodiment, the physical location of the device used to initial access the link is associated with the link and subsequent access to the link will only be allowed from the same geolocation where the device is located when the link is initially accessed. Subsequent attempts to access the link from a different location can be prohibited.

In one embodiment, geolocation tracking and device fingerprint technology can be used to eliminate the need for traditional passwords. When the recipient receives and clicks in the link, the link is associated with a unique identifier of the recipient computing device (e.g. MAC, NIC, IP address), the geographic location of the user or other designating information so that if subsequent access of the link is attempted that does not match the identifier, access to the link is not allowed. For example, the physical location (e.g. GPS coordinates) of the recipient's device can be detected and transmitted to the server when the link is initially accessed. The server can then associate the physical location with the link. If the subsequent access of from a device that does not match the physical location of the initial access, the subsequent access can be prevented. The unique identifier of the recipient's device can be detected and transmitted to the server when the link is initially accessed. The server can then associate the unique identifier with the link. If subsequent access is attempted using a device that does not match the unique identifier of the initial access, the subsequent access can be prevented. Multiple devices can be authorized for access for a single email address.

The ability to encrypt digital information is not limited to message or attachments. A device such as a printer, scanner or other imaging device 38 can be in communication with the encryption server 26 so that when digital information is created, such as scanned from a scanner or digitally enabled copier, the digital information can be transmitted to the gateway server or encryption server. A link to the encrypted scanned digital information can be then provided to a recipient. In one embodiment, a licensed user account can be associated with device 38 so that the attributes and properties of the encrypted digital information can be managed manually or can be set to operate automatically.

The computer readable instructions of the gateway server or encryption server can include instructions that can analyze the message or other digital information and determine if the content includes sensitive information where encryption is desired. In this case, the gateway server can then automatically send the information to the encryption server so that the message is encrypted, and a link provided to the recipient without the sender needing to determine if the message should be "bracketed". A list of trigger information can be used to determine if the information should be encrypted. For example, if an email message is being send by the sender, the email message could include either financial information in the body or in an attached spreadsheet. The gateway server can detect this information and automatically send the message and the attachment to the encryption server. In one example, if device 38 is used to digitize sensitive information such as health information, tax returns or financial information, the gateway server can detect this and send the digital information to the encryption server.

The present invention does not require specific client-side computer readable instructions for the sender to encrypt the message. The sender can use any email client or platform (e.g. iPhone, Android, Windows, Linux, or PC) to initiate a link to the secured information and provide the link to the recipient. From this point, the sender and the recipient can conduct two-way communications without content of the message passing through the respective email clients. Communications is provided through to the encryption server so that secured encrypted digital information is provided without modifications to the sender's email server and without encryption technology being needed at the email clients. In the case of the licensed sender, the sender's email client need not be used at all in one embodiment.

To provide a secure enjoinment without having to modify email clients or email servers and allow encryption functionality to be used with existing email platforms, the encrypted information is stored on the encryption server. In some cases, it may be advantageous to remove the encrypted information, decrypt the information and place the decrypted information on the mail server as if originally created without the present invention. This can be accomplished by exporting the encrypted information to the mail server so that it can be accessible by the email client. In this case, the sender or receiver, or other user, can initiate transfer of the information resulting in a decryption of the information and secure transmission of the decrypted information to the email server thereby placing the decrypted information in the proper inbox at 40.

Figure 2:
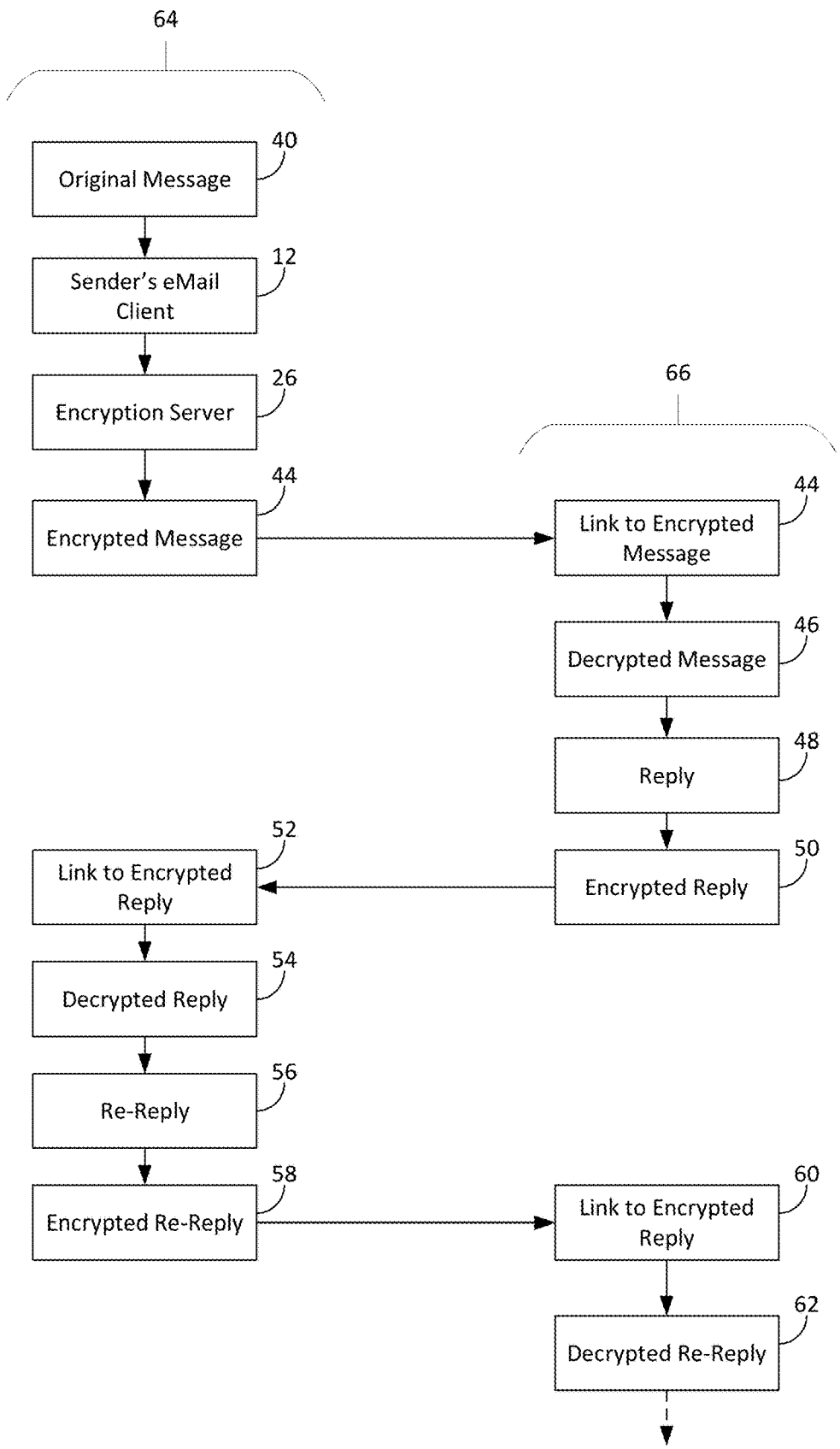
FIG. 2 is a diagram of aspects of the invention.

Referring to FIG. 2, The sender can create an original message, which can be text, images, attachments, or other digital information. The original message 40 can be created at the sender's email client 12 or by directly accessing the encryption server 26. The original message is encrypted producing an encrypted message 44 and stored on the encryption server or other location know to the encryption server. A link 46 to the encrypted server is generated and provided to the recipient through normal email protocols and systems. The recipient, by accessing the link to the encryption server or other location known to the encryption server, causes the message or information to be decrypted allowing the recipient to view the decrypted message at 46. The recipient creates a reply 48 that can be encrypted by 50. The sender can be notified that a reply was generated and a link to the encrypted reply 52 can be provided back to the sender. The sender can decrypt the reply so that the decrypted reply 54 is provided to the sender. The sender can create a re-reply 56 to the recipient which can be encrypted into an encrypted re-reply at 58. A link to the encrypted re-reply can be created and provided to the recipient at 60. The re-reply can be decrypted and provided to the sender at 62. In this process, there is the sender thread 64 and the recipients thread 66. The messages between the sender and recipient can continue extending the threads.

Typical to electronic message communications there is a sender and one or more recipients. There is a sender's thread and each of the recipient's thread. The computer readable instructions of the encryption server can use distinct encryption processes to encrypt each thread separately. Therefore each sender's and recipient's thread is encrypted with their own keys independent of each other so that the creator of the thread can control all copies of the threads and can preform tasks such as changing access and event delete specific threads.

Generally, the computer readable instructions can use asymmetrical encryption which uses two keys to access information: a public key for encryption, and a matching private key for decryption. The computer readable instructions can use symmetrical encryption which uses the same key to encrypt and decrypt information. In symmetrical encryption, it is desirable to keep both keys private. Symmetric encryption requires less computational power than asymmetric encryption and therefore is more efficient with computer resources and has better performance, than asymmetric encryption.

Figure 3:
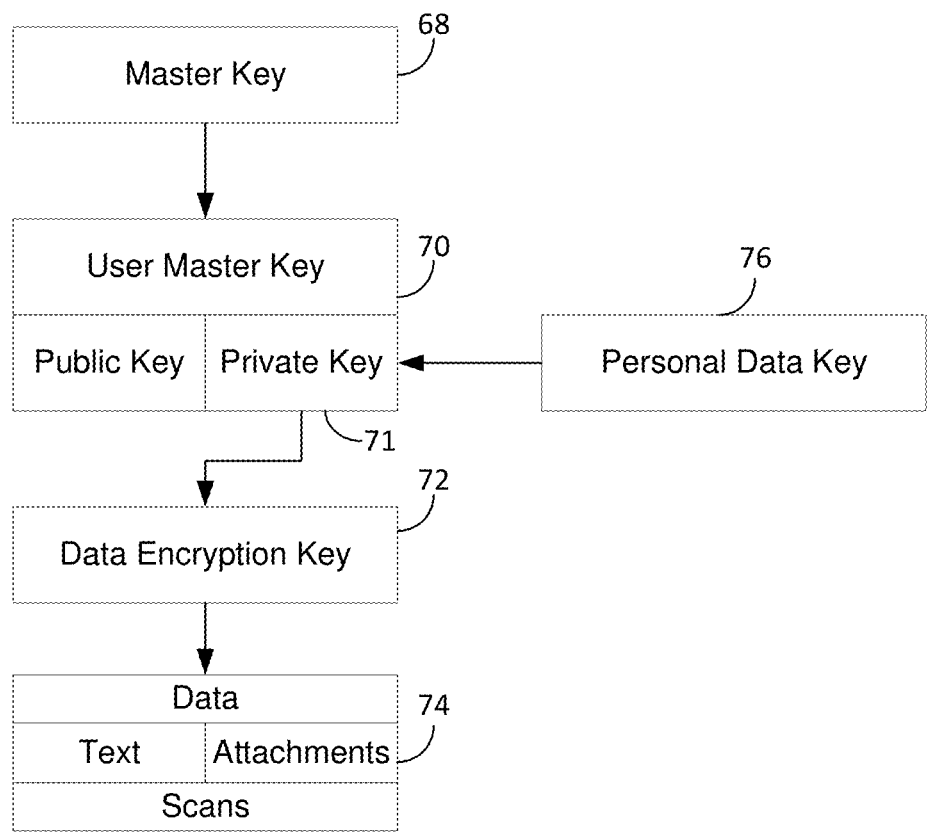
FIG. 3 is a diagram of aspects of the invention; and,
FIG. 4 is a diagram of aspects of the invention.

Referring to FIG. 3, the computer readable instructions of the present invention uses a composite encryption scheme incorporating both asymmetrical and symmetrical encryption. Master key 68 is a private key with restricted access. This key can be stored at an access controlled redundant facility with heightened physical and digital security. This key is known to only a few select individuals so that access to this master key is very limited. The master key is used to encrypt the private key 71 of the asymmetric user master key 70. The private key of the user master key can be used to encrypt a symmetrical data encryption key 72. The data encryption key is used to encrypt the data that can include message content and text, attachments, scanned information, spread sheets, and the like. Each item or type of data can be encrypted using a distinct data encryption key. Further the data can be separated into segments so that each segment can be encrypted with a separate data encryption key.

In one embodiment, the user can provide a personal data key 76 which is an alphanumeric string, that can be used with the private key and the user master key so that even with the private key, someone would need the personal data key to decrypt information. This adds an additional layer of protection to the encrypted information because the sender does not need to rely solely upon automatically generated keys used by the encryption server. The composite encryption scheme can include receiving the PDK from the user, placing the PDK in temporary memory such as RAM, encrypt the private key of the UMK and remove the PDK from memory so that the only record of the PDK would be what the user records. Therefore, even were the encryption server breached, the PDK would not be discoverable.

Figure 4:
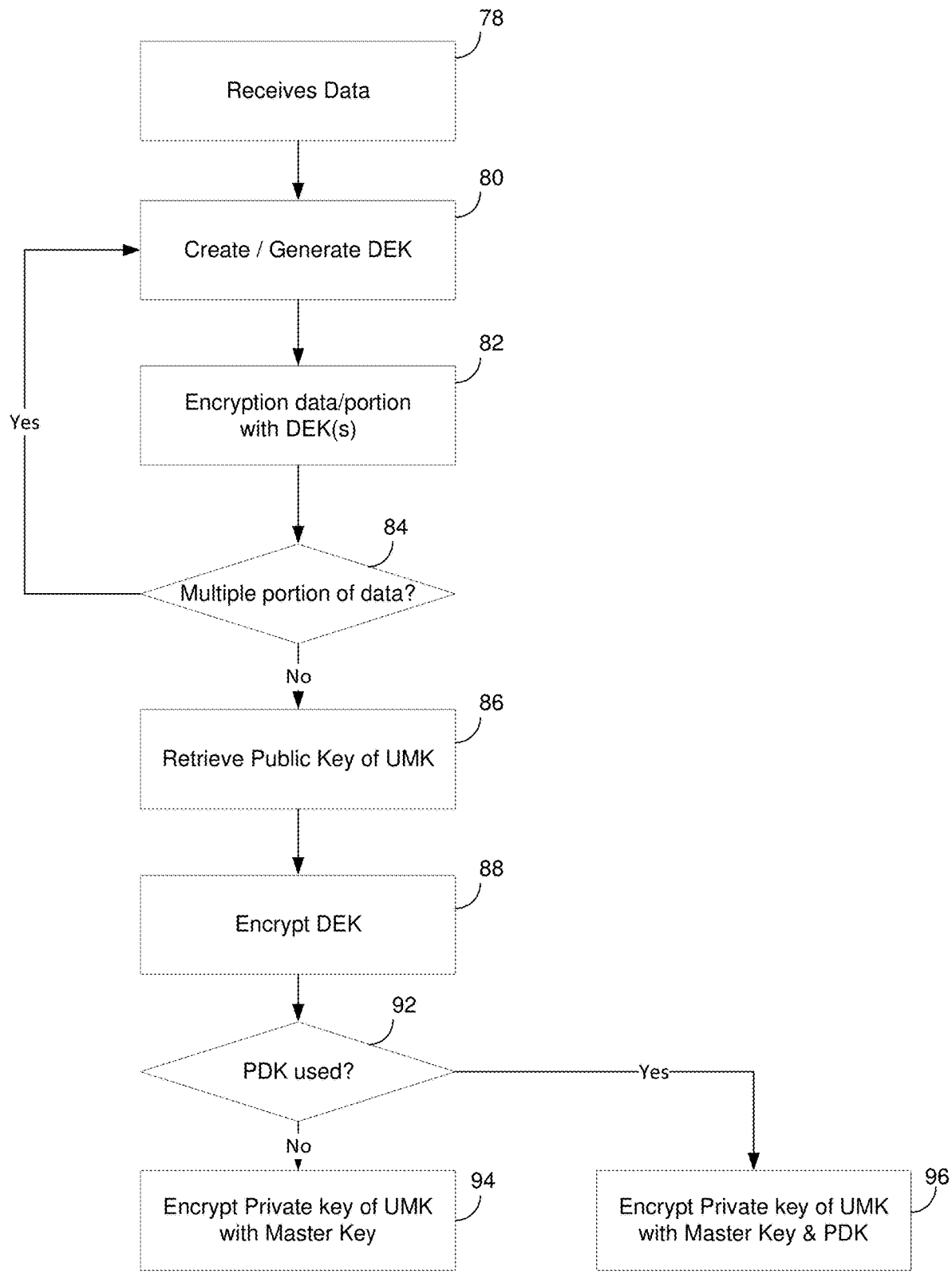

Referring to FIG. 4 the operation of the composite encryption scheme of the present invention is shown. The encryption server can receive data at 78 that is to be encrypted. A data encryption key (DEK) is created, generated or retrieved at 80 and the data is encrypted with the DEK at 82. A determination of whether additional elements or portion of the data needs to be encrypted at 84. If so, additional DEKs are created or retrieved and the respective element or portion is encrypted using additional DEK(s). For example, the data may include a text message, scanned document and spreadsheet attachment. The text message can be encrypted with a first DEK, the scanned document with a second DEK and the spreadsheet encrypted with a third DEK and so on. The data, including the text message, can also be portioned so that a first portion can be encrypted with a first DEK and the second portion encrypted with a second DEK. Encryption of the DEK can be represented as:

$$\sum_{i=1}^{n} E_i(DEK_i) \xrightarrow{yields} Enc_i$$

where n represents the number of data elements to be encrypted, $DEK_i$ means the DEK for the $i^{th}$ element, $E_i$o means the encryption process for the corresponding data element and $Enc_i$ is the resulting encrypted data element. For example, in a message with text content and an attachment, the encrypted text could be represented as $Enc_1$ encrypted with $DEK_1$ and $Enc_2$ can represent the encrypted attachment that was encrypted with $DEK_2$.

Once the data is encrypted using the DEK, the next layer is to protect the DEK from unauthorized discovery. The computer readable instructions can then encrypt the DEKs with asymmetrical encryption. The public key of the user master key (UMK) pair can be used to encrypt the DEK(s). The public key of the UMK can be retrieved for that user at 86 used to encrypt the DEK at 88. Therefore, the DEK can only be decrypted with the private key of the UMK used to encrypt the DEK. A determination can be made at 92 as to whether there is a personal data key (PDK). If there is no PDK, then the data is encrypted at 94. Otherwise, the data is encrypted using the PDK and DEK at 96.

With this composite encryption scheme, the message can have layered encryption with the UMK or the PDK know. Use of the PDK prevents the operators of the encryption server from being able to decrypt a user's message. Use of the MK prevents technical support from decrypting data without knowledge of the MK.

Using the composite encryption scheme, it is also possible to rotate the public and private keys of the UMK periodically without the need to decrypt the underlying data thereby keeping the underlying data secure. If the keys are to be rotated at the request of the sender, periodically, or by the encryption server operator, the DEK are decrypted and encrypted with the new UMK. Therefore, an efficient method of making prior UMK obsolete is provided that does not require revealing the underlying data. Encryption, in one embodiment, can be performed using a distributed, composite multi-layer encryption scheme with automatic key rotation.

In one embodiment, the default time where the email and/or attachment expires can be one year. This time period can be adjusted for shorter or longer periods. The email can be set to be deleted, accessed or recalled can be removed after a certain period of time.

The operation and advantages of the present invention over the prior art includes ease of use, no requirement for the installation of software, apps or plug-ins, password-free sign in, no recipient account requirement other than an email account, can be used with most if not all email clients, personalized notifications, large attachment sending capability, mobile and desktop devices can be used, can include SMTP TLS import/export gateway, can include composite/multi-layer AES256 encryption, can include, two factor authentication, can include distributed encryption keys so that keys and data are not stored together, geolocation sign-in requests can be provided, message expiration can be set to delete or remove messages at a certain period of time, recall expiration can be set preventing subsequent message recall, and notification-level subject masking can be included In one embodiment, the email client can be configured to be associated with the server using such designations as pop.server.email, imap.server.mail or smtp.server.email and the like. The server can intercept the sender's email, encrypt the email and send the link to the recipient. The computer readable instructions on the server can detect that the email of digital information is to be encrypted and retrieve key(s) to be used for that email, encrypt the email and store the encrypted email on the server. If the server does not detect brackets in the subject line or other indicators representing an encryption request, the server can simply pass along the email to the recipient traditionally. If the email is encrypted, the link to the server associated with the encrypted email is created and transmitted to the recipient as an email message that can appear in the recipient inbox. The recipient clicks the link and enters the recipient's email address. The server detects the email address and determines if the intended recipient of the encrypted email matches the email address of the recipient and if so, provide the content of the email, decrypted, to the recipient.

This invention is not limited to the transmission of email or other data. This invention can be used for the creation, storage, and/or transmission of any digital information including email. The invention can also encrypt not just the email, but any attachment(s) as well. The attachment(s) can also be deleted or have access removed after a certain predetermined period of time.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art Such objects, features, benefits and advantages will be apparent from the above in conjunction with the accompanying examples, data, figures and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A computerized system for encryption and transmission of digital information comprising:
   an encryption server having an encryption server processor and a non-transitory computer readable medium, wherein the encryption server is in communications with a sender computer device and a recipient computer device;
   a gateway server having a gateway processor in communications with the encryption server;
   a set of encryption server computer readable instructions included on the computer readable medium of the encryption server that, when executed by the encryption server processor, preform the steps of: receiving the original information set from the sender computer device, generating a sender key, encrypting a portion of the original information set with the sender key, generating a key pair having a public key and a private key, encrypting the sender key with the public key, encrypting the private key with a master key, generating a hyperlink to the encrypted portion of the original information set, transmitting the hyperlink to the recipient computer device wherein the hyperlink includes security properties taken from the group consisting of an expiration time for the hyperlink, an expiration time for the original information set, device dependent information, and geolocation dependent information, biometric information, or any combination thereof; and,
   a set of non-transitory gateway computer readable instructions on the gateway server that, during execution by the gateway processor, performs the steps of receiving the original information set and encrypting a portion of the original information set with the sender key in response to the original information set including a sensitive information.

2. The computerized system of claim 1 wherein the set of encryption server computer readable instructions include instructions for receiving a reply from the recipient computer device, generating a recipient key, encrypting the reply with the recipient key, encrypting the recipient key with the public key, creating a reply hyperlink to include a link to the encrypted reply, and transmitting the reply hyperlink to the sender computer device.

3. The computerized system of claim 1 wherein the sender computer device includes software taken from the group consisting of a text message client, email client, digital scanner, digitizing copies, digital image capture device or any combination thereof.

4. The computerized system of claim 1 wherein the recipient computer device includes an email client in communications with an email server for receiving the hyperlink and providing the hyperlink in an email message to a recipient.

5. The computerized system of claim 1 wherein the recipient computer device includes a text message client in communications with a text message server for receiving the hyperlink and providing the hyperlink in a text message to a recipient.

6. The computerized system of claim 1 including:
   a sender thread initiated by a creation of the original information set; a recipient thread initiated by the creation of a reply to the original information set; and,
   the set of encryption server computer readable instructions includes instructions for encrypting the sender thread with the sender key and encrypting the recipient thread with a recipient key.

7. The computerized system of claim 1 wherein the set of encryption server computer readable instructions include instructions for periodically generating a subsequent key pair having a public key and a private key pair; encrypting the sender key with the public key of a subsequently generated key pair and encrypting the private key of the subsequently generated key pair with the master key.

8. The computerized system of claim 1 wherein the set of encryption server computer readable instructions include instructions for providing an interface to a user for direct creation of the original information set.

9. The computerized system of claim 1 wherein the set of encryption server computer readable instructions include instructions for encrypting a first portion of the original information set with a first sender key and encrypting a second portion of the original information set with a second sender key.

10. The computerized system of claim 1 wherein a first portion is a text of an email message and a second portion is an attachment associated with the text of the email message.

11. The computerized system of claim 1 wherein a first portion is a first portion of text of an email message and a second portion is a second portion of text of the email message.

12. A computerized system for encryption and transmission of digital information comprising:
    an encryption server having an encryption server processor and a non-transitory computer readable medium, wherein the encryption server is in communications with a sender computer device and a recipient computer device; and,
    a set of encryption server computer readable instructions included on the encryption server computer readable medium that, when executed by the encryption server processor, preform the steps of: receiving an original information set, generating a sender key, encrypting a portion of the original information set with the sender key, generating a key pair having a public key and a private key, encrypting the sender key with a public key of the key pair, generating a hyperlink to the encrypted portion of the original information set, transmitting the hyperlink to the recipient computer device wherein the hyperlink includes security properties taken from the group consisting of an expiration time for the hyperlink, an expiration time for the original information set, device dependent information, geolocation dependent information, biometric information, or any combination thereof; and,
    a gateway server in communications with the encryption server and having a set of non-transitory gateway computer readable instructions configured for receiving the original information set and encrypting a portion of the original information set with the sender key in response to the original information set including a sensitive information.

13. The computerized system of claim 12 wherein the set of encryption server computer readable instructions include instructions for receiving a reply from the recipient computer device, generating a recipient symmetrical key, encrypting the reply with the recipient symmetric key, encrypting the recipient symmetrical key with a public key of the key pair, creating a reply hyperlink to include a link to the encrypted reply, and transmitting the reply hyperlink to the sender computer device.

14. The computerized system of claim 13 including:
    a sender thread initiated by a creation of the original information set;
    a recipient thread initiated by the creation of a reply to the original information set; and,
    the set of encryption server computer readable instructions includes instructions for encrypting the sender thread with the sender key and encrypting the recipient thread with a recipient key.

15. The computerized system of claim 13 wherein the set of encryption server computer readable instructions include instructions for encrypting a first portion of the original information set with a first sender key and encrypting a second portion of the original information set with a second sender key.

16. The computerized system of claim 13 wherein the set of encryption server computer readable instructions include instructions for periodically generating a subsequent key pair having a public key and a private key pair; encrypting the sender key with the public key of a subsequently generated key pair and encrypting the private key of the subsequently generated key pair with a master key.

17. A computerized system for encryption and transmission of digital information comprising:
    an encryption server having a non-transitory computer readable medium, wherein the encryption server is in communications with a sender computer device and a recipient computer device; a set of encryption server computer readable instructions included on the encryption server computer readable medium and configured for: receiving an original information set from the sender computer device, generating a sender key, encrypting a portion of the original information set with the sender key, generating a key pair having a public key and a private key, encrypting the sender key with the public key, encrypting the public key of the with a master key, generating a hyperlink to the encrypted portion of the original information set, transmitting the hyperlink to the recipient computer device; and,
    a gateway server in communications with the communications server and having a set of non-transitory gateway computer readable instructions configured for receiving the original information set and encrypting a portion of the original information set with the sender key in response to the original information set including a sensitive information.

18. The computerized system of claim 17 wherein the set of encryption server computer readable instructions include instructions for receiving a reply from the recipient computer device, generating a recipient key, encrypting the reply with the recipient key, encrypting the recipient key with the private key, creating a reply hyperlink to include a link to the encrypted reply, and transmitting the reply hyperlink to the sender computer device.

19. The computerized system of claim 17 wherein the set of encryption server computer readable instructions include instructions for scheduling deletion of the original information set, deletion of a message thread and deletion of a thread or portion thereof, after an expiration of a predetermined period of time.

* * * * *